E. A. BINNEY.
ALTERNATING CURRENT MOTOR.
APPLICATION FILED MAR. 19, 1918.
1,321,590.
Patented Nov. 11, 1919.
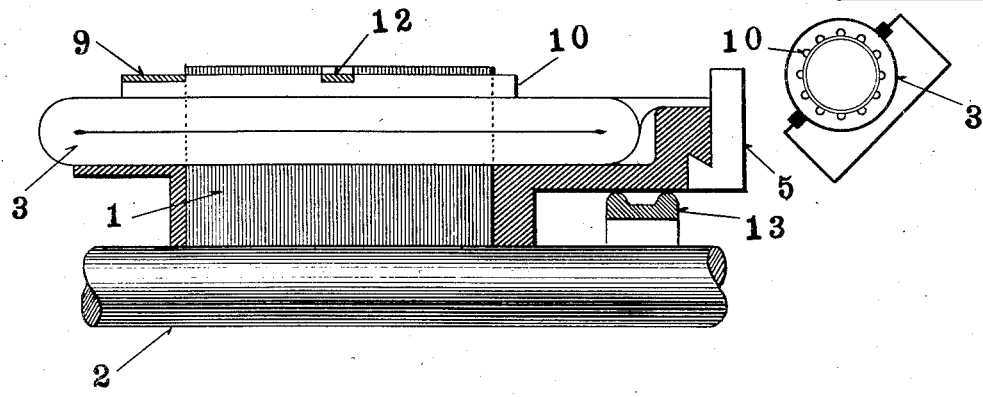
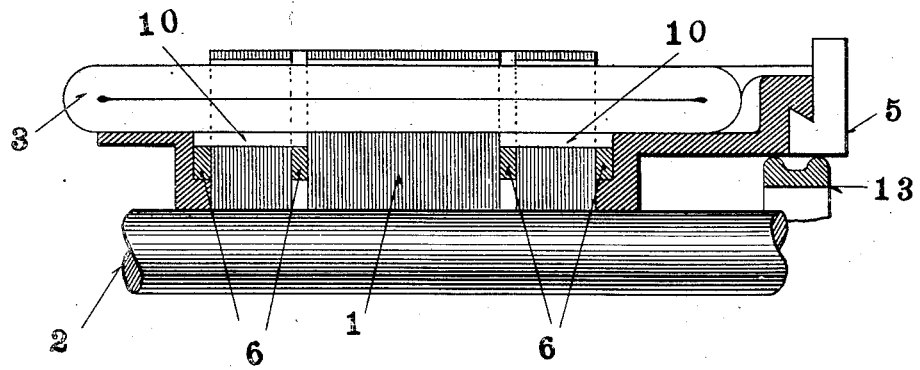
WITNESS
W. H. Alexander.
INVENTOR.
E. A. Binney.
BY
E. E. Huffman
ATTORNEY.

UNITED STATES PATENT OFFICE.

ERIC A. BINNEY, OF WASHINGTON, DISTRICT OF COLUMBIA.

ALTERNATING-CURRENT MOTOR.

1,321,590.   Specification of Letters Patent.   Patented Nov. 11, 1919.

Application filed March 19, 1918. Serial No. 223,412.

*To all whom it may concern:*

Be it known that I, ERIC A. BINNEY, a citizen of the United States of America, residing at the city of Washington, District of Columbia, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to alternating current motors, and is particularly useful in connection with single phase machines which start with the help of a commuted winding and operate with a short-circuited secondary, or induced member.

The object of my invention is to limit the maximum speed of such machines to somewhere near the synchronous speed, even when the short-circuiting device fails to operate or is not used, and to improve the speed torque characteristic in the neighborhood of the synchronous speed without seriously diminishing the torque at the moment of starting.

I achieve my objects by providing the induced member with a permanently short-circuited winding, such as a squirrel cage, and another winding and so disposing these on the induced member as to cause the permanently short-circuited winding to embrace a part of the rotor laminations, while the order winding embraces all of the rotor laminations. I prefer to locate the two windings in the same slots and in the closest inductive relation to each other, but always in such a manner as to cause the iron cross section embraced by, or inclosed within one winding to be less than the iron cross section embraced by, or inclosed within the other.

My invention will be better understood by reference to the accompanying drawing, in which Figure 1 is a diagrammatic representation of a single phase motor embodying my invention; Fig. 2 is a cross sectional view of the rotor; and Fig. 3 illustrates a modified rotor construction.

Singlephase motors which start with the help of a commuted winding on the induced member and operate with that member in total short-circuit are in general use. Such machines are usually started as singlephase series induction motors by short-circuiting the induced member along one axis per pole pair and displacing same with respect to the axis of the magnetization produced by the stator. Such machines develop a very large torque at starting, but this torque diminishes rapidly with increasing speed and often falls to the normal full-load torque, or to an even smaller value, at or near the synchronous speed. The short-circuiting device is usually set to entirely short-circuit the commuted winding a little before the synchronous speed is reached. Such machines have an excess of torque at starting and not quite enough torque at high speeds.

The improved motor shown in Fig. 1 carries on its induced member, a commuted winding 3, connected to the commutator 5 and embracing all of the rotor laminations 1. It also carries a short-circuited squirrel cage winding embracing one-half of the rotor laminations. This squirrel cage winding comprises bars 10 located above the winding 3 and in the same slots with said winding. These bars 10 are approximately of the same length as the rotor and serve to keep the winding 3 in place. At one end of the rotor, they are all interconnected by means of a short-circuiting ring 9 and they are similarly interconnected by means of another ring 12, located in a circumferential groove provided about the middle of the rotor. Those portions of the bars 10 which are located between the two short-circuiting rings 9 and 12 form part of the squirrel cage and act as wedges. The remaining portions of said bars merely act as wedges. The rotor is mounted on the shaft 2 and coöperates with the stator provided with the usual winding 7 adapted to be connected to the mains.

In Fig. 3 the rotor laminations are divided into three spaced groups, all of which are embraced by the commuted winding 3. Each of the outer groups also carries a squirrel cage winding the conductors of which are located at the bottom of the slots which accommodate the commuted winding 3 and are interconnected at each end by short-circuiting rings 6, two of which are located in the spaces separating the central group of rotor laminations from the two outside groups.

The mode of operation of this machine is somewhat as follows: Assuming the motor to be at rest, the short-circuiting device 13 will be inoperative if used, and the commuted winding 3 may be short-circuited by means of brushes coöperating with the commutator 5 along an axis displaced from that of the inducing winding 7 located on the stator. When the winding 7 is connected to an alternating current supply, then most of the starting flux produced by the stator will tend to thread that part of the rotor which is not shielded by the permanently short-circuited winding 10, the currents induced in it acting as a shield with respect to those portions of the rotor laminations which are embraced by said winding. The magnetic densities in the unprotected or unshielded parts of the rotor laminations will be very high at starting and large currents producing a large starting torque will be induced in the commuted winding 3. The shielding effect of the squirrel cage or cages will diminish as the speed increases, not only because of a change in the phase of the squirrel cage currents, but also because of a change in the magnitude of said currents; whereas the squirrel cage contributes nothing to the torque of the motor at the moment of starting because of the unsuitable phase relation between the squirrel cage currents and the available flux, yet these conditions also change with increasing speed. The squirrel cage soon begins to develop a useful torque and by the time the motor has reached a nearly synchronous speed, this torque is quite pronounced and increases the total torque of the motor. The effect of the squirrel cage may be made large enough to prevent the machine from materially exceeding its synchronous speed, even without totally short-circuiting the commuted winding 3. When the motor has reached a speed near the synchronous, the short-circuiting device, if used, entirely short-circuits the commuted winding 3, as indicated in Fig. 3 and can be arranged to lift the brushes off the commutator 5. Under these conditions, the motor operates like an ordinary singlephase squirrel cage induction motor, having two entirely short-circuit windings on its induced member. Instead of short-circuiting the commuted winding 3 by means of brushes along an axis displaced from that of the stator windings, a suitable rotor magnetization can be produced by conduction, as is well understood.

Having fully described my invention, what I claim as new and desire to secure by Letters Patent of the United States is:

1. In an alternating current motor, an induced member provided with a squirrel cage winding and with a commuted winding, the commuted winding embracing all of the laminations of the induced member and the squirrel cage winding embracing part only of said laminations.

2. In an alternating current motor, an induced member provided with a squirrel cage winding and with a commuted winding, the commuted winding embracing all of the laminations of the induced member and the squirrel cage winding embracing part only of said laminations, and means for short-circuiting the commuted winding along a plurality of axes.

3. In an alternating current motor, a slotted induced member provided with two windings, one of said windings being a squirrel cage winding embracing a smaller portion of the laminations of the induced member than embraced by the other winding, said windings being located in the same slots and the conductor bars of the squirrel cage winding being positioned above the conductors of the other winding and provided with extensions whereby the said bars overlie the conductors of the other winding throughout the entire length of the slots.

In testimony whereof, I have hereunto set my hand and affixed my seal.

ERIC A. BINNEY. [L. S.]